US009332147B2

(12) United States Patent
Oh (10) Patent No.: US 9,332,147 B2
(45) Date of Patent: May 3, 2016

(54) IMAGE FORMING APPARATUS AND METHOD OF BOOTING IMAGE FORMING APPARATUS HAVING HIBERNATION FUNCTION (71) Applicant: Samsung Electronics Co., Ltd., Suwon-si, Gyeonggi-do (KR)

(72) Inventor: Chang-geun Oh, Uiwang (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 655 days.

(21) Appl. No.: 13/626,469

(22) Filed: Sep. 25, 2012

(65) Prior Publication Data
US 2013/0124842 A1 May 16, 2013

(30) Foreign Application Priority Data
Nov. 15, 2011 (KR) ........................ 10-2011-0119126

(51) Int. Cl.
*G06F 9/24* (2006.01)
*G06F 9/00* (2006.01)
*G06F 1/00* (2006.01)
*G06F 11/00* (2006.01)
*H04N 1/00* (2006.01)
*G06F 11/14* (2006.01)
*G06F 9/44* (2006.01)
*G06F 1/32* (2006.01)
*G06F 11/07* (2006.01)
*G06F 21/60* (2013.01)

(52) U.S. Cl.
CPC .......... *H04N 1/00885* (2013.01); *G06F 9/4418* (2013.01); *G06F 11/1417* (2013.01); *G06F 11/1469* (2013.01); *G06F 1/32* (2013.01); *G06F 1/3284* (2013.01); *G06F 9/4401* (2013.01); *G06F 11/0766* (2013.01); *G06F 11/0793* (2013.01); *G06F 11/1458* (2013.01); *G06F 21/60* (2013.01)

(58) Field of Classification Search
None
See application file for complete search history.

(56) References Cited

U.S. PATENT DOCUMENTS

| 6,209,088 | B1* | 3/2001 | Reneris ............................ 713/1 |
| 2002/0138792 | A1* | 9/2002 | Shinichi et al. ............... 714/700 |
| 2005/0132179 | A1* | 6/2005 | Glaum et al. ....................... 713/1 |
| 2007/0112899 | A1* | 5/2007 | Edwards et al. ............... 707/205 |
| 2007/0277051 | A1* | 11/2007 | Reece et al. ................... 713/323 |
| 2009/0150463 | A1* | 6/2009 | Sekiguchi et al. ............. 707/204 |
| 2011/0037993 | A1* | 2/2011 | Lee et al. ....................... 358/1.14 |
| 2011/0107020 | A1 | 5/2011 | Duan |
| 2012/0036346 | A1* | 2/2012 | Bower et al. ....................... 713/2 |
| 2012/0221875 | A1* | 8/2012 | Bak et al. ....................... 713/323 |

OTHER PUBLICATIONS

Kunhoon Baik et al., "Boosting up Embedded Linux device: experience on Linux-based Smartphone", *Proceedings of the Linux Symposium* (Ottawa, Ontario, Canada, Jul. 13-16, 2010), pp. 9-18 (11 pages).

* cited by examiner

*Primary Examiner* — Ji H Bae
(74) *Attorney, Agent, or Firm* — Staas & Halsey LLP (57) ABSTRACT A method of booting an image forming apparatus having a hibernation function. In the method, when booting of the image forming apparatus starts, whether a storage device has a defect is checked based on a flag indicating whether the hibernation function is activated, and a system of the image forming apparatus is booted using a stored boot image.

17 Claims, 5 Drawing Sheets

IMAGE FORMING APPARATUS AND METHOD OF BOOTING IMAGE FORMING APPARATUS HAVING HIBERNATION FUNCTION

CROSS-REFERENCE TO RELATED APPLICATIONS

This application claims the priority benefit of Korean Patent Application No. 10-2011-0119126, filed on Nov. 15, 2011, in the Korean Intellectual Property Office, the disclosure of which is incorporated herein in its entirety by reference.

BACKGROUND

1. Field

Example embodiments of the following disclosure relate to an image forming apparatus and a method of booting an image forming apparatus having a hibernation function, and more particularly, to an image forming apparatus and method of checking whether a storage device has a defect, based on a flag indicating whether a hibernation function is activated.

2. Description of the Related Art

Recently, various hardware functions of electronic products have been replaced with software functions thereof. This is because advancement in hardware technologies has reduced restrictions to software. However, as various functions have been provided using software, software capacity has been increased and software processing has become complicated. Thus, a system booting time/speed of an electronic product has become slower. Although a system booting time varies according to system type, a personal computer (PC) or a server system has a very long booting time for initializing device drivers therein and the system, thus causing a waste of energy or time. Additionally, a system booting speed has been an important issue for not only computers and server systems but also other electronic products having various functions, such as digital televisions, mobile communication terminals, and navigators, for example. In recent years, the speeds of booting electronic products range from about several seconds to several minutes.

SUMMARY

The following disclosure provides an image forming apparatus and a method of booting an image forming apparatus having a hibernation function.

The following disclosure also provides a non-transitory computer readable recording medium having recorded thereon a computer program for executing the method.

Additional aspects will be set forth in part in the description which follows and, in part, will be apparent from the description, or may be learned by practice of the presented embodiments.

According to an aspect of the following disclosure, there is provided a method of booting an image forming apparatus having a hibernation function, the method including loading a stored bootloader and kernel in the image forming apparatus; when the loading starts booting of a system of the image forming apparatus, checking whether a storage device that stores a booting image has a defect, based on a flag indicating whether the hibernation function is activated; and if it is determined that the storage device does not have a defect, booting the system by using the stored boot image.

According to another aspect of the following disclosure, there is provided a method of generating a boot image to perform a hibernation function in an image forming apparatus, the method including when a request to power off the image forming apparatus by using the hibernation function is received, freezing processes that are being performed in the image forming apparatus; recording a flag to indicate whether the hibernation function is activated so as to check whether a storage device for storing the boot image has a defect; and generating the boot image to include information about a system state while the processes are frozen.

According to another aspect of the following disclosure, there is provided a non-transitory computer readable recording medium having recorded thereon a computer program for performing the methods.

According to another aspect of the following disclosure, there is provided an image forming apparatus which is booted using a hibernation function, the image forming apparatus including a controller for loading a stored bootloader and kernel in the image forming apparatus; a checking unit for checking whether a storage device that stores a booting image has a defect, based on a flag indicating whether the hibernation function is activated, when the loading starts booting of a system of the image forming apparatus; and a booting unit for booting the system by using the stored boot image when it is determined that the storage device does not have a defect.

According to another aspect of the following disclosure, there is provided an image forming apparatus for generating a boot image to perform a hibernation function, the image forming apparatus including a controller for freezing processes that are being performed in the image forming apparatus when a request to power off the image forming apparatus by using the hibernation function is received, and recording a flag to indicate whether the hibernation function is activated so as to check whether a storage device for storing the boot image has a defect; and a generation unit for generating the boot image to include information about a system state while the processes are frozen.

BRIEF DESCRIPTION OF THE DRAWINGS

The above and other features and advantages of the following disclosure will become more apparent by describing in detail exemplary embodiments thereof with reference to the attached drawings in which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Example embodiments will now be described more fully with reference to the accompanying drawings. Expressions such as "at least one of," when preceding a list of components, modify the entire list of components and do not modify the individual components of the list.

Figure 1:
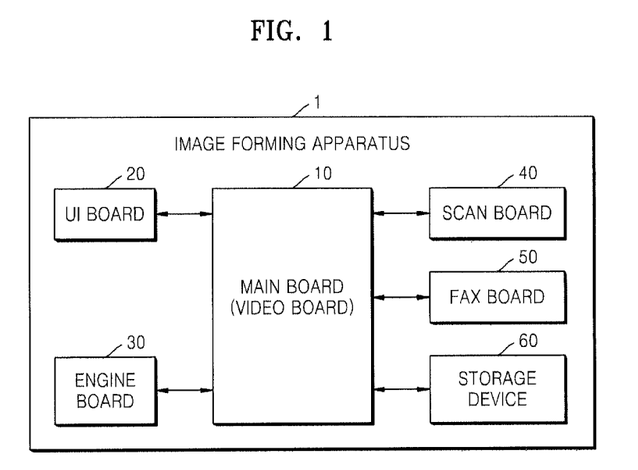
FIG. 1 is a block diagram of an image forming apparatus according to an example embodiment.

FIG. 1 is a block diagram of an image forming apparatus 1 according to an example embodiment. Referring to FIG. 1, the image forming apparatus 1 includes a main board (video board) 10, a user interface (UI) board 20, an engine board 30, a scan board 40, a fax board 50, and a storage device 60. FIG. 1 illustrates only some hardware components of the image forming apparatus 1 related to the current embodiment in order to prevent the characteristics of the current embodiment from being obscured. However, it will be obvious to those of ordinary skill in the art that the image forming apparatus 1 may further include other general hardware components.

The image forming apparatus 1 may be an individual device, such as a printer, a scanner, or a facsimile machine, or a multi-functional peripheral (MFP) device capable of performing various functions, e.g., copying, printing, scanning, faxing, sending email, and so on. For convenience of explanation, it will be hereinafter assumed that the image forming apparatus 1 is an MFP device, but the disclosure is not limited thereto.

Referring to FIG. 1, when the image forming apparatus 1 is an MFP device, the image forming apparatus 1 may include not only the main board 10 but also other types of boards. The UI board 20 controls a user interface function via which a user may manipulate the image forming apparatus 1. The engine board 30 controls functions of a printer engine (not shown) included in the image forming apparatus 1. The scan board 40 controls a scanner function of scanning a document and generating an image from among functions of the image forming apparatus 1. The fax board 50 controls a fax function of generating an image from fax data received from the outside from among the functions of the image forming apparatus 1.

The main board 10 controls the other boards, for example, the UI board 20, the engine board 30, the scan board 40, and the fax board 50. In other words, the main board 10 generates an image to be printed by the image forming apparatus 1, and performs a key function of controlling the overall system of the image forming apparatus 1.

Booting of the system of the image forming apparatus 1 is completed by first booting the main board 10 and then booting the other boards under control of the main board 10. Thus, the main board 10 should have higher processing performance than those of the other boards, and various types of software needed to be processed in a more complicated manner than those included in the other boards are driven to boot the main board 10. That is, since an operating system (OS) for controlling the other boards and various types of software are driven in the main board 10, a time for booting the main board 10 is longer than those for booting the other boards. Thus, when the system of the image forming apparatus 1 is booted, the time for booting the main board 10 is recognized to be substantially the same as a time for booting the system.

Recently, a hibernation function has been used to reduce a booting time of an electronic device, e.g., an embedded device, a mobile device, and a computing device. The hibernation function allows the system to be powered off while all data retained in, for example, a system memory is recorded or stored in a non-volatile memory, such as a hard disc drive (HDD), and the data stored in the non-volatile memory to be loaded again into the system memory to restore to the original system state when the system is powered on again.

To perform the hibernation function, all the data stored in the system memory is stored in the form of a boot image. A boot image according to an example embodiment may also be referred to as a snapshot image. The boot image means data that contains all information for booting an electronic device to restore to a system state at a particular point of time when the boot image was generated. In other words, the boot image is an image containing data stored in a volatile memory, data stored in a central processing unit (CPU) register, and cache information, which indicate information needed at a system state when the electronic product is initially booted.

With the hibernation function, it is possible to far rapidly boot the electronic product than when all processes of booting the system are performed again.

In an example embodiment, since a main operating system (OS) of the image forming apparatus 1 is booted by the main board 10 of the image forming apparatus 1, the hibernation function may be activated in the main board 10. However, if a conventional hibernation function is used in each of most electronic products, including the image forming apparatus 1, then the supply of power to an HDD is forcibly cut off, and may thus be broken when a user forcibly powers off the electronic product or power cutoff occurs in the electronic device. If the HDD is broken, the electronic product cannot normally operate, and booting of the system may be impossible. Furthermore, the hibernation function cannot also be used. As described above, conventionally, whether a HDD, e.g., the storage device 60, has a defect is not checked, before the system is booted using the hibernation function.

In the image forming apparatus 1 according to an example embodiment, whether the storage device 60 has a defect is checked before the system is booted using the hibernation function so as to prevent the system from being booted due to the defect in the storage device 60. Thus, even if the storage device 60 has a defect, the defect may be corrected and then the image forming apparatus 1 may be booted using the hibernation function.

Referring to FIG. 1, the storage device 60 that communicates with the main board 10 may be an HDD or a non-volatile memory device installed in the image forming apparatus 1, or an external non-volatile detachably installed in the memory image forming apparatus 1.

First, a process of generating a boot image in the image forming apparatus 1 having the hibernation function in order to check whether the storage device 60 has a defect will be described in detail below. Then, a process of booting the image forming apparatus 1 by using the hibernation function to check whether the storage device 60 has a defect will be described in detail.

Figure 2:
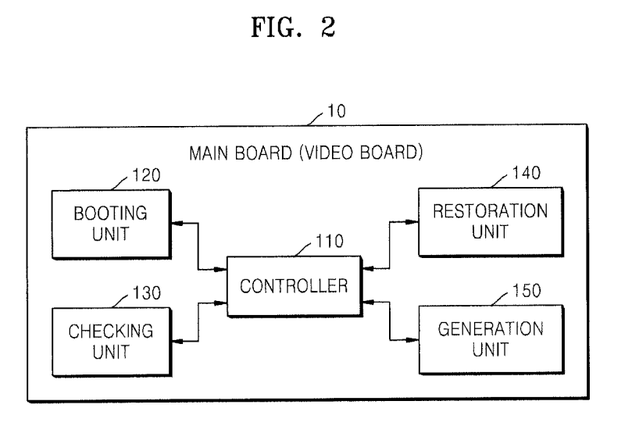
FIG. 2 is a block diagram of a main board included in the image forming apparatus of FIG. 1, according to an example embodiment.

FIG. 2 is a block diagram of a main board 10 included in the image forming apparatus 1 of FIG. 1, according to an example embodiment. Referring to FIG. 2, the main board 10 includes a controller 110, a booting unit 120, a checking unit 130, a restoration unit 140, and a generation unit 150. These components of the main board 10 will be described in detail below. The components of the main board 10 illustrated in FIG. 2 may correspond to a processor of the main board 10. The processor of the main board 10 may be embodied as an array of logic gates or a general microprocessor. In other words, it will be obvious to those of ordinary skill in the art that the processor of the main board 10 may be embodied as any of various types of hardware.

FIG. 2 illustrates only some components of the main board 10 related to an example embodiment in order to prevent the characteristics of the present embodiment from being obscured. However, it will be obvious to those of ordinary skill in the art that the main board 10 may further include other general hardware components.

Figure 3:
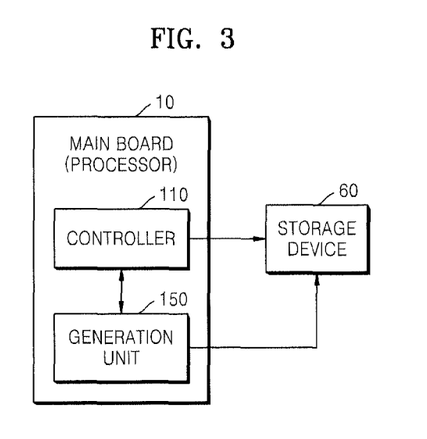
FIG. 3 is a block diagram of a main board for generating a boot image to perform a hibernation function, according to another example embodiment.

FIG. 3 is a block diagram of a main board 10 for generating a boot image to perform the hibernation function, according to another example embodiment. Referring to FIG. 3, the main board 10 includes a controller 110 and a generation unit 150, as illustrated in FIG. 2. For convenience of explanation, FIG. 3 illustrates only some components of the main board 10 related to the present embodiment.

Figure 4:
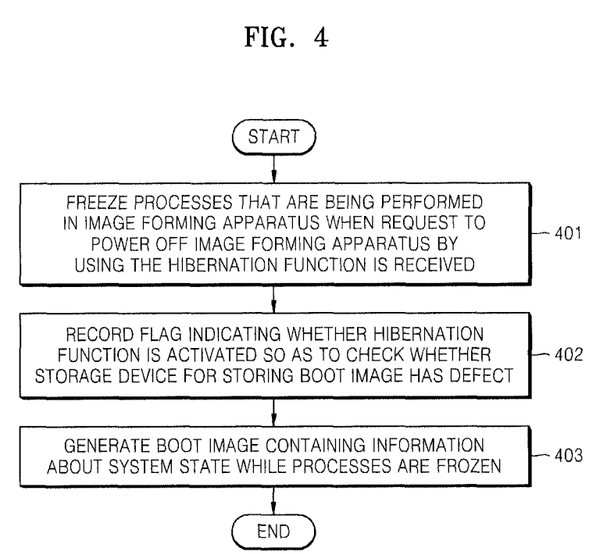
FIG. 4 is a flowchart illustrating a method of generating a boot image to perform the hibernation function in an image forming apparatus with a main board, according to an example embodiment.

FIG. 4 is a flowchart illustrating a method of generating a boot image to perform the hibernation function in the image forming apparatus 1 with the main board 10 illustrated in FIG. 1, according to an example embodiment. Operations included in the method of FIG. 4 may be sequentially performed by the main board 10 of FIG. 3. Thus, this method will be described with reference to FIGS. 3 and 4 below.

In operation 401, when the controller 110 receives a request to power off the image forming apparatus 1 by using the hibernation function, the controller 110 freezes processes that are being performed in the image forming apparatus 1. More specifically, a user of the image forming apparatus 1 may input this request to the main board 10 via a UI screen of the image forming apparatus 1 controlled by the UI board 20. In this case, the user may request to power off the image forming apparatus 1 in such a manner that the hibernation function may be activated. In other words, the activating of the hibernation function of the image forming apparatus 1 may be understood as a maximum power save mode of the image forming apparatus 1. That is, in operation 401, when the user requests to power off the image forming apparatus 1 in such a manner that the hibernation function may be activated, the processes that are being performed in the image forming apparatus 1 are frozen.

In operation 402, the controller 110 records a flag indicating whether the hibernation function is activated to check whether the storage device 60 for storing a boot image has a defect. That is, the boot image is stored in the storage device 60 after operation 402 is performed. As described above, the storage device 60 may be an HDD or a non-volatile memory device installed in the image forming apparatus 1, or an external non-volatile memory device detachably installed in the memory image forming apparatus 1. According to an example embodiment, the boot image may be stored in an HDD of the storage device 60 and the recorded flag may be stored in the non-volatile memory in the storage device 60. According to another example embodiment, the boot image may be stored in the HDD in the storage device 60 and the recorded flag may be stored in the external non-volatile memory. In other words, it will be obvious to those of ordinary skill in the art that spaces for respectively storing the boot image and the flag are not limited thereto.

In operation 403, the generation unit 150 generates a boot image containing information about a system state while the processes that are being performed are frozen. As described above, the boot image is stored in the storage device 60, e.g., the HDD or the internal non-volatile memory device.

Figure 5:
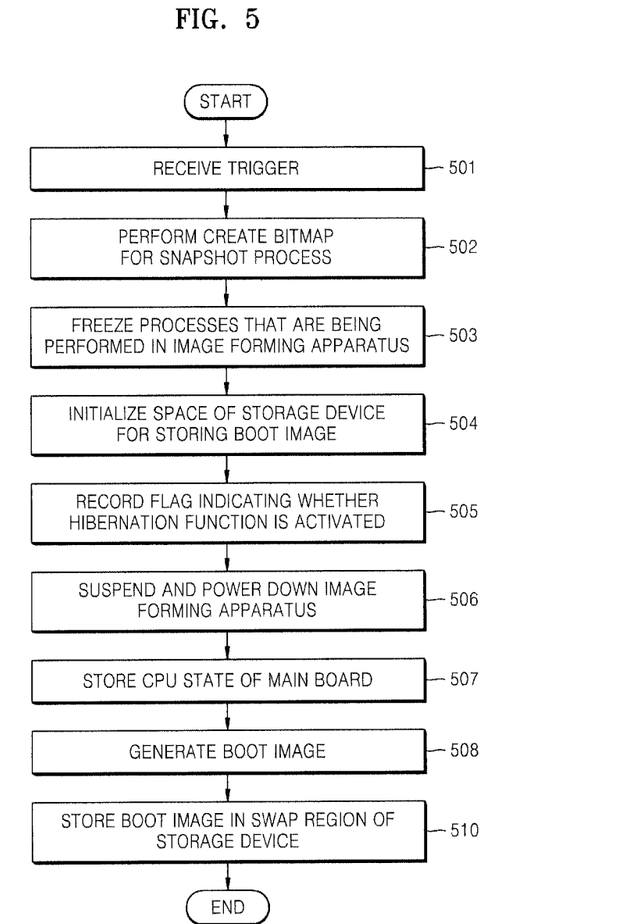
FIG. 5 is a flowchart illustrating a method of generating a boot image to perform the hibernation function in the image forming apparatus with the main board illustrated in FIG. 1, according to another example embodiment.

FIG. 5 is a flowchart illustrating a method of generating a boot image to perform the hibernation function in the image forming apparatus 1 with the main board 10 illustrated in FIG. 1, according to another example embodiment. FIG. 5 may be understood as a detailed flowchart of the method of FIG. 4.

Referring to FIGS. 1, 2, and 5, in operation 501, the controller 110 receives a request to power off the image forming apparatus 1 by using the hibernation function. That is, the controller 110 may receive a trigger input by a user of the image forming apparatus 1 to activate the hibernation function of the image forming apparatus 1. The user may input the trigger for activating the hibernation function, via a UI screen of the image forming apparatus 1 controlled by the UI board 20. For example, if an OS of the image forming apparatus 1 is Linux, the controller 110 may call an 'echo disk >/sys/power/state' command when the trigger is input by the user.

In operation 502, the controller 110 performs a create bitmap for snapshot process to store a bitmap that was displayed on the UI screen by the UI board 20 before the controller 110 receives the request.

In operation 503, the controller 110 freezes processes that are being performed in the image forming apparatus 1. If these processes are not frozen, an error may occur during creation of a boot image. For example, the controller 110 may freeze processes related to, for example, copying, printing, scanning, faxing, an address book, and a document box, which are being performed in the image forming apparatus 1. Thus, the controller 110 may freeze processes for controlling the engine board 30, the scan board 40, and the fax board 50 that are related to copying, printing, scanning, and faxing. If the OS of the image forming apparatus 1 is Linux, the controller 110 may freeze these processes by calling a 'freeze_processes( )' command.

In operation 504, the controller 110 initializes a space of the storage device 60 for storing a boot image in order to secure a sufficient memory to store the boot image. That is, the controller 110 performs a shrink memory process. For example, if the OS of the image forming apparatus 1 is Linux, the controller 110 may initialize the space of the storage device 60 for storing a boot image by calling a 'free_some_memory( )' or 'shrink_all_memory( )' command.

In operation 505, the controller 110 records or marks a flag indicating whether the hibernation function is activated, in the storage device 60. The flag is used to check whether the storage device 60 for storing a boot image has a defect, when the image forming apparatus 1 that is in a hibernation state is rebooted. For example, when the hibernation function is activated, the controller 110 may record or mark a flag '1' in the storage device 60.

As described above, the flag is stored in the storage device 60, e.g., an HDD, an internal non-volatile memory device, or an external non-volatile memory device. In addition, the flag may be stored in the storage device 60 in which a boot image is stored or is not stored. Since the flag should not be lost even when a power cutoff occurs in the image forming apparatus 1, the flag is stored in a HDD or a non-volatile memory capable of retaining data even when a power cutoff occurs.

In operation 506, the controller 110 performs a suspend and power down device process to suspend and power down the image forming apparatus 1. For example, if the OS of the image forming apparatus 1 is Linux, the controller 110 may perform the suspend and power down device process by calling the 'device_suspend( )' and 'device_power_down( )' commands.

In operation 507, the controller 110 performs a save system state process to store a CPU state of the main board 10. For example, if the OS of the image forming apparatus 1 is Linux, the controller 110 may perform the save system state process by calling the 'save_processor_state( )' and 'swsusp_arch_suspend( )' commands.

In operation 508, the generation unit 150 performs an allocate memory and copy memory contents process to generate a boot image containing information about a system state while the processes that are being performed are frozen. In other words, the information about the system state includes data stored in a volatile memory, data stored in a CPU register, and cache data, which indicate information needed to boot the image forming apparatus 1 while these processes are frozen. For example, if the OS of the image forming apparatus 1 is Linux, the controller 110 may perform an allocate memory and copy memory contents process by calling the 'swsusp_alloc( )' and 'copy_data_pages( )' commands.

In operation 509, the controller 110 performs a write to swap process to store the boot image in a swap region of the storage device 60. The swap region may correspond to some partitions of the storage device 60, such as an HDD or an internal/external non-volatile memory.

Then, the image forming apparatus 1 enters the hibernation state. For example, if the OS of the image forming apparatus 1 is Linux, the controller 110 may perform the write to swap process by calling a 'write_suspend_image( )' command.

As described above, according to an example embodiment, the image forming apparatus 1 perform operation 505 of recording or marking the flag indicating whether the hibernation function is activated, in the storage device 60 to check whether the storage device 60 has a defect, unlike in a conventional method.

A process of booting the image forming apparatus 1 to check whether the storage device 60 has a defect when such a flag is recorded or marked in the storage device 60, will now be described.

Figure 6:
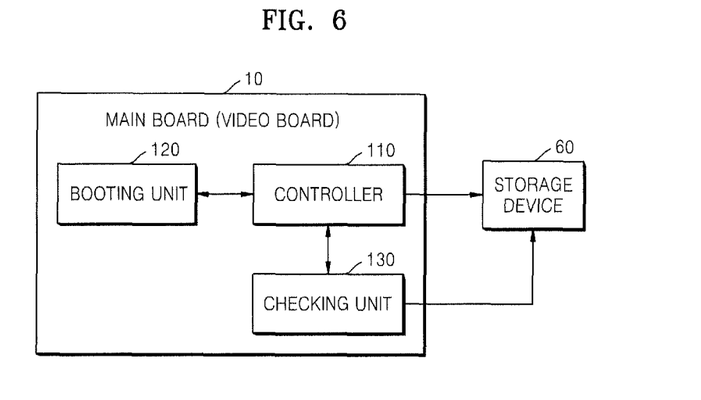
FIG. 6 is a block diagram of a main board booted using the hibernation function, according to another example embodiment.

FIG. 6 is a block diagram of a main board 10 booted using the hibernation function, according to another example embodiment. Referring to FIG. 6, the main board 10 includes the controller 110, the booting unit 120, and the checking unit 130, as illustrated in FIG. 2. For convenience of explanation, FIG. 6 illustrates only some components of the main board 10 related to the present embodiment.

Figure 7:
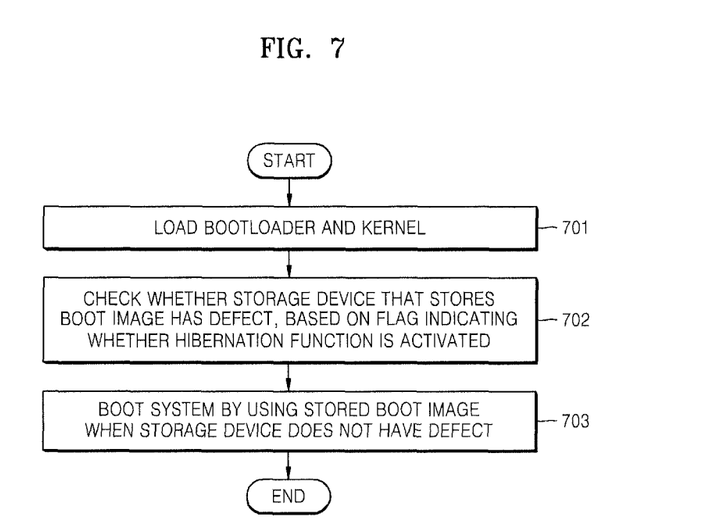
FIG. 7 is a flowchart illustrating a method of booting the image forming apparatus with the main board illustrated in FIG. 1 by using the hibernation function, according to an example embodiment.

FIG. 7 is a flowchart illustrating a method of booting the image forming apparatus 1 with the main board 10 illustrated in FIG. 1 by using the hibernation function, according to an example embodiment. Operations included in the method of FIG. 7 may be sequentially performed by the main board 10 of FIG. 6. Thus, this method will be described with reference to FIGS. 6 and 7 below.

In operation 701, the controller 110 controls a stored bootloader and a kernel to be loaded in the image forming apparatus 1. In other words, the controller 110 controls booting of the image forming apparatus 1 to be started.

In operation 702, when the booting of the system of the image forming apparatus 1 is started by loading the bootloader and the kernel, the checking unit 130 checks whether the storage device 60 that stores a boot image has a defect, based on a flag indicating whether the hibernation function is activated. The flag is recorded or marked in the storage device 60 when the boot image is generated and stored to perform the hibernation function, as described above with reference to FIGS. 3 to 5.

In operation 703, if it is determined in operation 702 that the storage device 60 does not have a defect, the booting unit 120 boots the system, based on the stored boot image.

Figure 8:
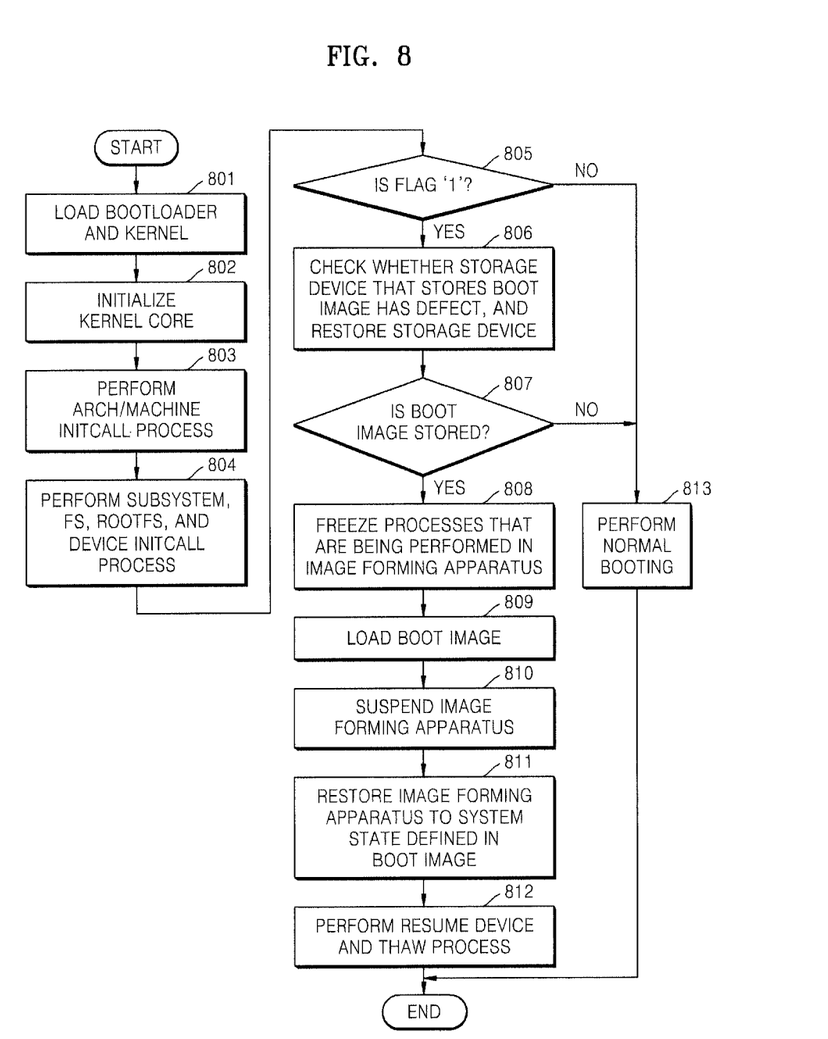
FIG. 8 is a flowchart illustrating a method of booting the image forming apparatus with the main board illustrated in FIG. 1 by using the hibernation function, according to another example embodiment.

FIG. 8 is a flowchart illustrating a method of booting the image forming apparatus 1 with the main board 10 illustrated in FIG. 1 by using the hibernation function, according to another example embodiment. FIG. 8 may be understood as a detailed flowchart of the method of FIG. 7.

In operation 801, when the image forming apparatus 1 is powered on, the controller 110 controls a stored bootloader and a kernel to be loaded in the image forming apparatus 1. More specifically, when the controller 110 controls the bootloader to be loaded in the image forming apparatus 1, the bootloader loads the kernel. By loading the kernel, the main board 10 is driven to start booting of the image forming apparatus 1.

In operation 802, the controller 110 performs an initialize kernel core process to initialize a kernel core, thereby setting a CPU core in the main board 10.

In operation 803, the controller 110 performs an arch/machine initcall process of initializing the loaded kernel to initialize basic settings related to the booting of the main board 10.

In operation 804, the booting unit 120 performs an initial booting process included in a normal booting process to initialize the system of the image forming apparatus 1 by mounting a root files system (rootfs). More specifically, the controller 110 performs a subsystem, fs, rootfs, and device initcall process. In other words, during hibernation booting according to the present embodiment, the controller 110 first performs the initial booting process included in the normal booting process, unlike conventional hibernation booting that does not include the initial booting process included in the normal booting process.

In operation 805, the controller 110 checks a flag indicating whether the hibernation function is activated. If the flag indicates that the hibernation function is activated, e.g., if the flag is '1', then the controller 110 controls the checking unit 130 to check whether the storage device 60 that stores a boot image has a defect.

In operation 806, the checking unit 130 checks whether the storage device 60 that stores a boot image has a defect, based on the flag. In other words, if the flag indicates that the hibernation function is activated, e.g., if the flag is '1', then the checking unit 130 checks whether the storage device 60 that stores a boot image has a defect.

When the checking performed in operation 806 ends, the controller 110 controls the flag to be changed to indicate that the hibernation function is deactivated or to be changed to '0', and be then recorded or marked.

If the checking unit 130 determines that the storage device 60 has a defect, the restoration unit 140 restores the storage device 60. For example, if the OS of the image forming apparatus 1 is Linux, the restoration unit 140 may restore the storage device 60 by using an 'e2fsck' command provided in Linux.

That is, in operation 806, a Check HDD and recovery process is performed.

In operation 807, if in operation 806, the storage device 60 is determined to not have a defect or is restored to a normal state, then the controller 110 determines whether the storage device 60 stores a boot image. In this case, the controller 110 may read a header of a swap region to determine whether the boot image is stored in the swap region of the storage device 60.

In operation 808, if it is determined in operation 807 that the boot image is stored, then the controller 110 freezes processes that are being performed in the image forming apparatus 1. For example, the controller 110 freezes processes related to an OS and applications that are being performed in the image forming apparatus 1.

In operation 809, the controller 110 loads the stored boot image in the storage device 60.

In operation 810, the controller 110 suspends the image forming apparatus 1. That is, the controller 110 suspends all systems that are being operated in the image forming apparatus 1. For example, the controller 110 suspends the other boards of the image forming apparatus 1, e.g., the UI board 20, the engine board 30, the scan board 40, and the fax board 50, a network device of the image forming apparatus 1, and peripheral devices, such as a universal serial bus (USB) device.

In operation 811, the booting unit 120 restores the image forming apparatus 1 to a system state defined in the boot image, based on the loaded boot mage.

In operation 812, the booting unit 120 resumes the image forming apparatus 1 and thaws the frozen processes. In other words, the controller 110 performs a resume device and thaw process.

In operation 813, if it is determined in operation 805 that the flag indicates that the hibernation function is deactivated, e.g., the flag is '0', or if it is determined in operation 807 that the boot image is not stored, then the booting unit 120 performs normal booting, e.g., cold booting.

The above example embodiments may be embodied as a computer program. The computer program may be stored in a non-transitory computer readable recording medium, and executed using a general digital computer. Data structures used in the above embodiments may be recorded on a computer readable recording medium via any of various means. Examples of the computer readable medium are a magnetic recording medium (a ROM, a floppy disc, a hard disc, etc.), and an optical recording medium (a CD-ROM, a DVD, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc - Read Only Memory), and a CD-R (Recordable)/RW.

Further, according to an aspect of the embodiments, any combinations of the described features, functions and/or operations can be provided.

Moreover, the image forming apparatus 1 may include at least one processor to execute at least one of the above-described units and methods.

While the above disclosure has been particularly shown and described with reference to exemplary embodiments thereof, it will be understood by those of ordinary skill in the art that various changes in form and details may be made therein without departing from the spirit and scope of the disclosure as defined by the appended claims. The exemplary embodiments should be considered in descriptive sense only and not for purposes of limitation. Therefore, the scope of the disclosure is defined not by the detailed descriptions but by the appended claims, and all differences within the scope will be construed as being included in the disclosure.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of booting an image forming apparatus having a hibernation function, the method comprising:
    loading a stored bootloader and kernel in the image forming apparatus;
    checking whether a storage device that stores a boot image has a defect, based on a flag indicating whether the hibernation function is activated, when the loading starts booting of a system of the image forming apparatus;
    determining whether the storage device stores the boot image; and
    booting the system by using the stored boot image, when it is determined that the boot image is stored in the storage device and the storage device does not have a defect.

2. The method of claim 1, wherein the checking of whether the storage device storing the boot image has a defect comprises checking whether the storage device has a defect when the flag indicates that the hibernation function is activated.

3. The method of claim 2, when the checking of whether the storage device has a defect ends, further comprising changing the flag to have a state indicating that the hibernation function is deactivated.

4. The method of claim 1, wherein the flag is recorded when the boot image for performing the hibernation function is stored.

5. The method of claim 1, when it is determined that the storage device has a defect, further comprising restoring the storage device, and
    wherein the booting of the system comprises booting the system when the storage device is restored to a normal state.

6. The method of claim 5, wherein the restoring of the storage device comprises restoring the storage device by using an e2fsck command.

7. The method of claim 1, when the loading starts booting of the system, further comprising performing an initial booting process included in a normal booting process of the system to initialize the system by mounting a root files system, and
    wherein the checking of whether the storage device storing a boot image has a defect comprises checking whether the storage device has a defect when the performing of the initial booting process ends.

8. The method of claim 1, wherein the storage device comprises at least one from among a hard disc drive included in the image forming apparatus, an internal non-volatile memory device, and an external non-volatile memory device connected to the image forming apparatus.

9. The method of claim 1, wherein the loading of the stored bootloader and kernel comprises loading the stored bootloader and kernel to drive at least a main board included in the image forming apparatus.

10. A non-transitory computer readable recording medium having recorded thereon a computer program for executing the method of claim 1.

11. An image forming apparatus which is booted using a hibernation function, the image forming apparatus comprising:
    a processor programmed to implement:
        a controller to load a stored bootloader and kernel in the image forming apparatus and determine whether a storage device stores a boot image;
        a checking unit to check whether the storage device that stores the boot image has a defect, based on a flag indicating whether the hibernation function is activated, when the loading starts booting of a system of the image forming apparatus; and
        a booting unit to boot the system by using the stored boot image when it is determined that the boot image is stored in the storage device and the storage device does not have a defect.

12. The image forming apparatus of claim 11, wherein the checking unit checks whether the storage device has a defect when the flag indicates that the hibernation function is activated.

13. The image forming apparatus of claim 12, wherein, when the checking of whether the storage device has a defect ends, the controller controls the flag to be changed to a state indicating that the hibernation function is deactivated.

14. The image forming apparatus of claim 11, wherein the processor is programmed to further implement a restoration unit for restoring the storage device when it is determined that the storage device has a defect, and
    wherein the booting unit boots the system when the storage device is restored to a normal state.

15. The image forming apparatus of claim 11, wherein when the loading starts booting of the system, the booting unit performs an initial booting process included in a normal booting process of the system to initialize the system by mounting a root files system, and
    when the performing of the initial booting process ends, the checking unit checks whether the storage device has a defect.

16. The image forming apparatus of claim 11, wherein the storage device comprises at least one from among a hard disc drive included in the image forming apparatus, an internal non-volatile memory device, and an external non-volatile memory device connected to the image forming apparatus.

17. The image forming apparatus of claim 11, wherein the processor is programmed to further implement a generation unit to generate the boot image to include information about a system state during a state in which processes are frozen.

* * * * *